Figure 1:
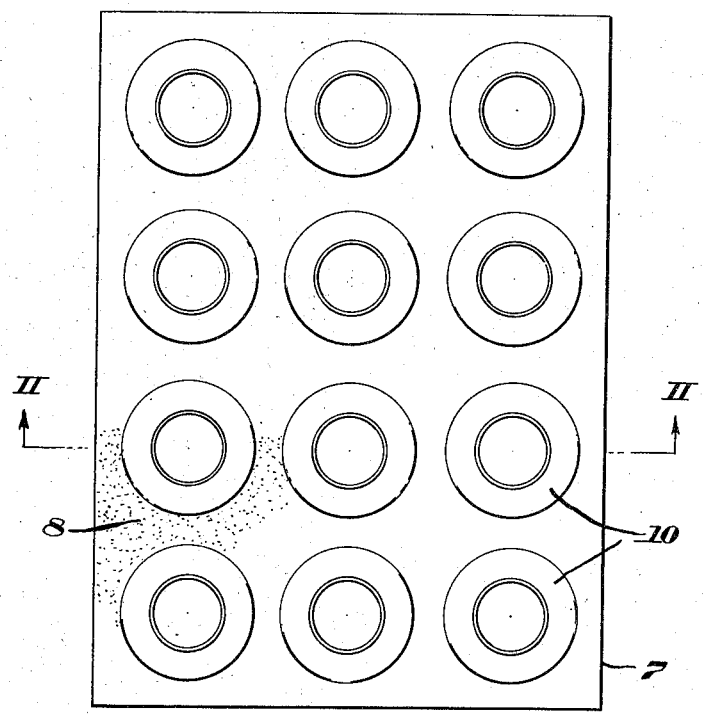

April 24, 1951        E. HARDESTY        2,550,147

METHOD OF FIRING CERAMIC ARTICLES AND APPARATUS THEREFOR

Filed Sept. 30, 1947        3 Sheets-Sheet 1

INVENTOR
EUGENE HARDESTY
by his attorneys
Stebbins, Blenko & Webb

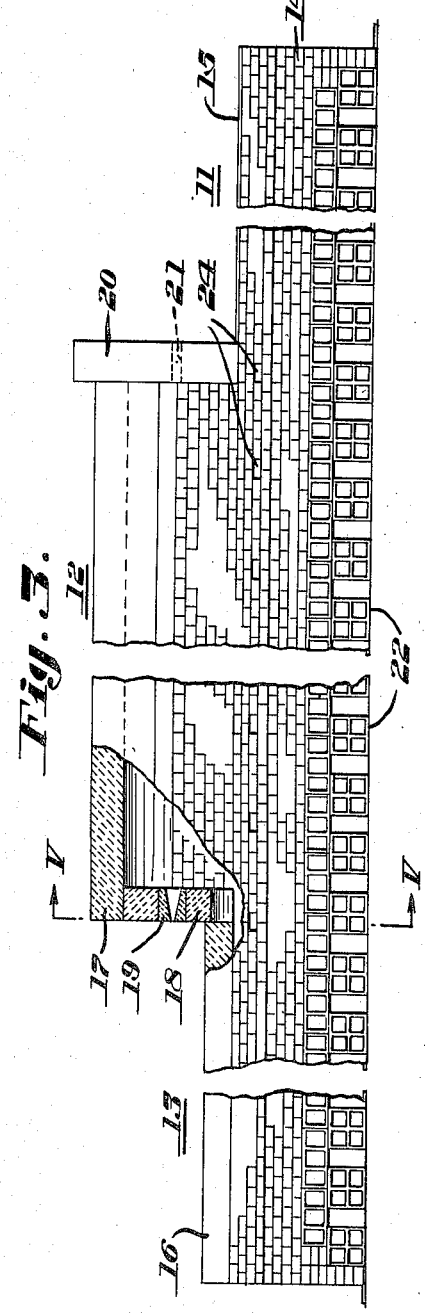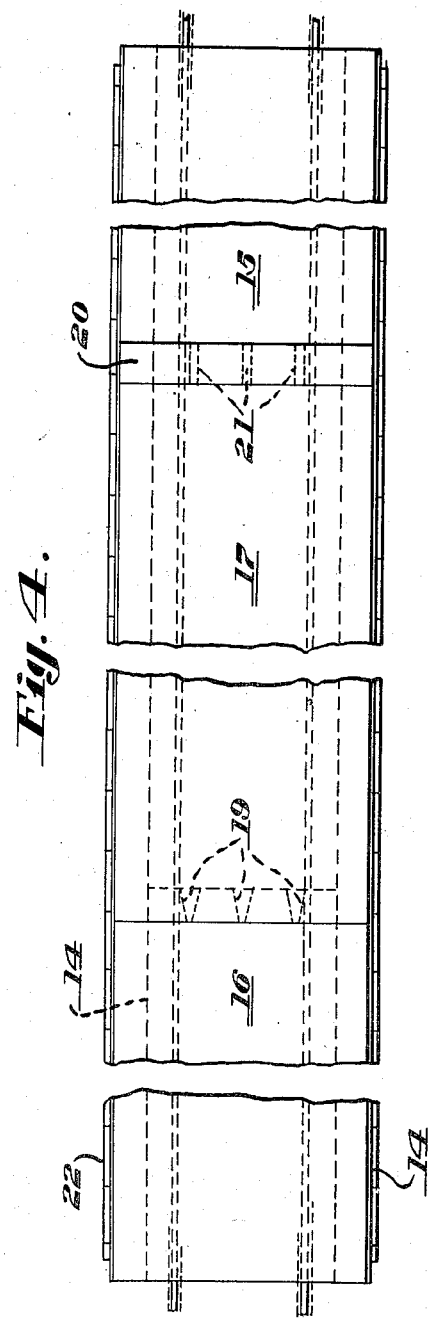

April 24, 1951  E. HARDESTY  2,550,147
METHOD OF FIRING CERAMIC ARTICLES AND APPARATUS THEREFOR
Filed Sept. 30, 1947  3 Sheets-Sheet 3

INVENTOR
EUGENE HARDESTY
by his attorneys
Stebbins, Blenko & Webb

Patented Apr. 24, 1951

2,550,147

UNITED STATES PATENT OFFICE 2,550,147

METHOD OF FIRING CERAMIC ARTICLES AND APPARATUS THEREFOR

Eugene Hardesty, New Brighton, Pa.; Ann C. Hardesty administratrix of said Eugene Hardesty, deceased Application September 30, 1947, Serial No. 777,014

6 Claims. (Cl. 25—142)

This application relates to a method of firing ceramic articles and apparatus therefor whereby the time heretofore required for firing such articles is greatly reduced. The method and apparatus are particularly useful for firing that type of china known as fine dinnerware and therefore they will be described with reference thereto. It should be understood, however, that they can be used for firing any ceramic product such as tile, vitrefied or unvitrefied face brick, "hotel china," etc.

Generally the manufacture of dinnerware requires the following steps. The "body" or clay mixture is molded to form a "bat." The bat is put on a mold which is placed on a jigger to trim it to proper size, dried, and then "finished," during which latter step sharp edges cut by the jigger are rounded. Thereafter the pieces of clay mixture are placed into a kiln and fired until the clay is vitrified to the extent desired. True china is a full vitrified clay mixture.

The fired clay or "bisque" is then dipped in a glaze and again fired following which the china is decorated and again fired.

My method is particularly advantageous in the manufacture of fine dinnerware for the first firing step, that is, when the clay forms are fired to vitrify them and make the bisques. My method may also be used, however, for firing the glaze.

Heretofore, the process of firing clay to form the bisque has been a difficult, time-consuming, and expensive operation. In order to fire the clay forms so as to vitrify the clay it is necessary that the silica in the clay be converted by heating to tridymite thence to cristobalite and then back to silica without shattering the separate pieces. Shattering is caused by uneven conversion and inversion of the silica which in turn is caused by uneven heat treatment. The problem of heating becomes increasingly difficult as the pieces of china become thinner.

In an attempt to uniformly heat the separate pieces of china it has heretofore been the practice to bring the pieces very slowly up to the correct temperature and to then cool them slowly. The pieces have also been protected from direct exposure to the heat of the kiln. Thus a molded clay piece is placed on a refractory setter, additional clay pieces are stacked on top of the first piece to form a bung. The bung is placed on a vibrator and a sheet metal form is placed around both. Sand is poured into the form and is worked between the pieces by vibration. The bung is next placed in a refractory container or sagger. Several saggers are then placed on a kiln car and the car is rolled slowly through the kiln. Large quantities of china have thus been fired at one time, but the heating and cooling periods necessary to avoid shattering have been extremely long. Thus in the above described firing process thirty days are required for firing the china, the glaze and the decoration. Large quantities of pieces must be stored in various stages of manufacture so as to maintain a continuous operation. Storage and handling of these quantities add greatly to the cost of manufacture.

Thin pieces of china have created another problem with this method of firing. In order to make the process commercially possible, large quantities must be fired at one time. This requires stacking the pieces seven or eight high on a setter, but if the pieces are stacked many of them are distorted during firing particularly if thin dinnerware is being made.

Because of all these difficulties the products now sold as "fine dinnerware" are usually semi-vitrified or semi-porcelain. Likewise, no extremely thin china is made today in the United States.

I have invented a method for firing ceramic products and an apparatus for carrying out the method whereby the firing time is greatly reduced and extremely thin china can be made on a production basis. Few, if any, of the pieces shatter during firing and the pieces are not distorted. By my method it is possible to fire the clay, the glaze, and the decoration in fourteen hours.

Figure 2:
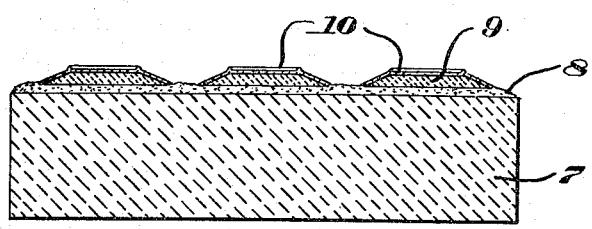
Figure 5:
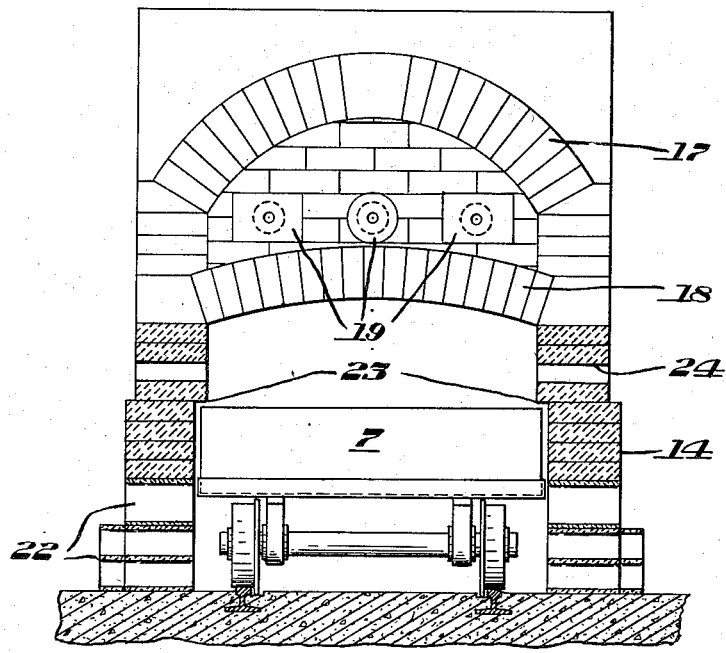
Figure 6:
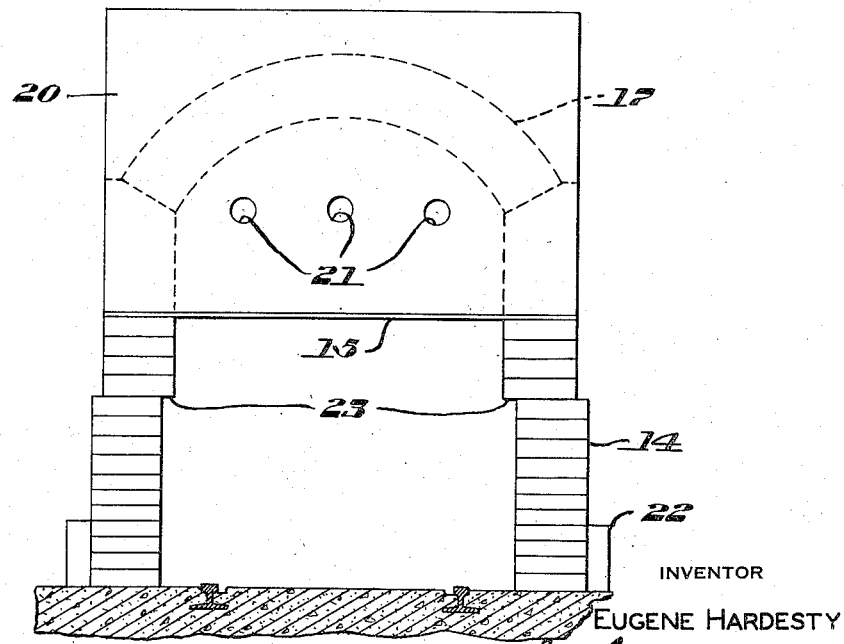

In the accompanying drawings I have illustrated present preferred embodiments of my method and of my apparatus for firing china in which:

Figure 1 is a plan view of a kiln car showing the arrangement of pieces to be fired on the car, Figure 2 is a section along the lines II—II of Figure 1, Figure 3 is a fragmentary side elevation of a kiln in which my method may be employed, a portion thereof being broken away for purposes of illustration, Figure 4 is a plan view of the kiln shown in Figure 3, Figure 5 is a section along the lines V—V of Figure 3, and Figure 6 is an end view from the right, viewing Figure 3.

My method of firing china is carried out as follows:

The top surface of the refractory body 7 of a conventional kiln car is covered with a thin layer of powdered refractory material 8. Setters 9 are then placed on the thin layer of powdered refractory. The pieces of clay mixture 10 which are to be fired are then placed on the setters, the setters being designed so that the pieces are placed upside down. The setters may be what are known as "permanent setters" or powdered refractory material may be molded into the desired shape for each firing. It should be noted that only a single layer of clay pieces is placed across the top of the kiln car. Stated in another way, the pieces are stacked only "one high."

A kiln is heated in such a manner that it has in effect three temperature zones or sections—a central firing zone or section and heating and cooling sections at opposite ends of the firing section. The firing section is also heated in such a manner that the interior of the roof covering the firing section is luminous.

The kiln car is rolled through the furnace so that it passes first through the heating zone, then into the firing zone and finally into the cooling zone. The car moves steadily, its pace being determined by the time required to vitrify the clay to the extent desired.

Since the pieces are stacked only one high and since no protective covering is placed over them, they are directly exposed to radiation from the luminous roof of the kiln and to the products of combustion. It is believed, however, that the greater portion of the heat is supplied by radiation from the kiln roof. Because of the direct exposure of each piece to radiation the pieces are quickly vitrified. There is little shattering because the heat is uniformly distributed through each piece during firing and uniformly removed while the car is in the cooling section of the furnace.

The kiln which I have invented for carrying out my process is shown in Figures 3 to 6 inclusive. As there shown, my kiln is in the form of an elongated furnace having two side walls and a roof. Broadly speaking, the kiln is divided into a heating zone 11, a firing zone 12, and a cooling zone 13.

The sections of the furnace having the heating and cooling zones comprise two low side walls 14 which support a flat roof. This roof may be a sheet of iron 15 or other metal shown as covering the heating zone 11 or a block of refractory material 16 shown as covering the cooling zone 13.

The central section of the furnace in which the firing zone is located is higher than the sections of the furnace having the heating and cooling zones and has a roof 17 of refractory material. It may be made of refractory bricks laid up in an arch and supported by the side walls 14.

Between the firing and cooling zones of the furnace a second arch 18 is formed beneath the arched roof 17. This arch supports burner blocks 19 above the level of the roof 16 of the cooling zone. The space between the two arches 17 and 18 and the burner blocks is bricked up so as to seal the end of the central section above the arch 18.

Standard burners are placed in the burner blocks. They should be selected and regulated, however, so that they will supply for combustion sufficient gas to fire the china and sufficient air so that all of the gas is burned within the kiln and approximately 10% free air remains. By adjusting the burner so that there is 10% of free air within the furnace and by making the furnace sufficiently long a chimney or exhaust flue is eliminated.

The end of the central section adjacent the heating zone 11 is closed by a block of refractory material 20 which may be cast in place. Holes 21 cut in this block may be plugged or kept open to control the action of the flame from the burners 19.

As shown particularly in Figures 3 and 5 of the drawings, the side walls 14 are made of hollow tiles 22 which provide a plurality of apertures extending transversely through the side walls. These apertures allow air to flow from outside of the kiln into the lower part of the kiln to cool the undercarriages of kiln cars.

The side walls 14 are offset inwardly at 23 (see Figure 5). These offsets are slightly above the top of the refractory beds 7 of the kiln cars so that they form, with the cars, a seal which reduces the amount of heat which flows down around the kiln cars.

The side walls 14 have observation ports 24 spaced at intervals along the main walls so that the progress of the firing can be checked.

My method of firing ceramic products results in pieces which are uniform in shape because they are individually supported and during firing do not have to support additional pieces. Few, if any, pieces are shattered during firing because by my process I obtain uniform distribution of heat through each piece. The pieces are directly exposed to the heat so that rapid firing is possible. If dinnerware is fired the pieces are placed up-side-down on top of the kiln car the section of each piece of greatest thickness, i. e., the foot, is placed closest to the source of heat, i. e., radiation from the roof.

Since each piece is directly exposed during firing, it is possible to adjust the firing process as to time and temperature so that the complete process can be adjusted in accordance with the thickness of ware being fired. The total time required for firing is greatly reduced. In fact, the time is limited primarily by the time required to place the pieces on the kiln cars. Thus, it is possible to do the actual firing operation in production in two hours. Heretofore, such firing on a production basis has been considered impossible.

Since each piece of china is separately supported and since each piece is directly exposed to radiation whereby even distribution of heat is obtained it is possible to fire on a production basis the finest and thinnest types of dinnerware. This has never been done before in the United States.

The kiln which I have invented is specially designed to carry out my method and has several other advantages over the kilns heretofore used. It may be manufactured at approximately 15% of the cost of kilns now in use. Blowers are not needed to circulate the heated gases to fire the clay and to locate the different heating and cooling zones. Also a chimney is not needed.

While I have described certain present preferred embodiments of my invention, it is to be understood that they may be otherwise variously embodied within the scope of the appended claims.

I claim:

1. The method of continuously firing ceramic articles which includes placing pieces of clay mixture to be fired face down across a refractory surface in a single layer, supporting the whole surface of the face of each piece between the face and the refractory surface, directly exposing the pieces to a source of heat until the desired degree of vitrification is obtained and thereafter cooling the pieces.

2. The method of continuously firing ceramic articles which includes heating the inside surface of a furnace roof until it is luminous, spacing pieces of clay mixture to be fired face down across a refractory surface in a single layer, supporting the whole surface of the face of each piece between the face and the refractory surface and passing the pieces under said furnace roof, thereby exposing the pieces directly to heat radiated from the roof until the pieces are vitrified to the degree desired.

3. A kiln for firing ceramic articles comprising an elongated furnace having a central section higher than either end section, a burner port in one end of the central section and a control port in the other end, both the burner and control ports being above the top level of the end sections.

4. A kiln for firing ceramic articles comprising an elongated furnace having sidewalls and a roof and having preheating, firing, and cooling zones, the portion of the roof covering the firing zone being higher than the roof portions covering the other zones, a burner port between the cooling and firing zones and adjacent the portion of the roof covering the firing zone, the lower portions of the side walls having passages connecting the interior of the kiln adjacent its floor to atmosphere outside the kiln.

5. The method of continuously firing ceramic articles in quantity which includes placing pieces of clay mixture to be fired face down across a refractory surface in a single layer and supporting the whole surface of the face of each piece between the face and the refractory surface and heating the pieces to the desired degree of vitrification principally by exposure to radiant heat.

6. The method of continuously firing ceramic articles which comprises passing articles to be fired under the roof of an elongated kiln, heating the roof with a flame and adjusting the fuel and air mixture for the flame so as to produce a luminous flame and to provide air in the kiln in excess of that required for combustion.

EUGENE HARDESTY.

REFERENCES CITED

The following references are of record in the file of this patent:

UNITED STATES PATENTS

| Number | Name | Date |
| --- | --- | --- |
| 1,526,582 | Beasley | Feb. 17, 1925 |
| 1,532,017 | Wry | Mar. 31, 1925 |
| 1,562,441 | Curtis | Nov. 24, 1925 |
| 1,630,587 | Speirs | May 31, 1927 |
| 1,799,296 | Harter et al. | Apr. 7, 1931 |
| 1,875,365 | Begeman | Sept. 6, 1932 |
| 2,041,176 | Hartford | May 19, 1936 |